Sept. 28, 1965   G. M. WEBSTER   3,209,317
SEISMIC EXPLORATION
Filed April 3, 1961   5 Sheets-Sheet 1

FIG. 1

FIG. 2   Gerald M. Webster INVENTOR.

BY John D. Gassett
ATTORNEY

Sept. 28, 1965　　　　G. M. WEBSTER　　　　3,209,317
SEISMIC EXPLORATION

Filed April 3, 1961　　　　　　　　　5 Sheets-Sheet 2

Gerald M. Webster *INVENTOR.*

BY *John D. Gassett*
ATTORNEY

Sept. 28, 1965  G. M. WEBSTER  3,209,317
SEISMIC EXPLORATION
Filed April 3, 1961  5 Sheets-Sheet 3

Gerald M. Webster INVENTOR.

BY John D. Gassett
ATTORNEY

Sept. 28, 1965   G. M. WEBSTER   3,209,317
SEISMIC EXPLORATION
Filed April 3, 1961   5 Sheets-Sheet 4

Gerald M. Webster INVENTOR.

BY John D. Gassett
ATTORNEY

Sept. 28, 1965   G. M. WEBSTER   3,209,317
SEISMIC EXPLORATION
Filed April 3, 1961   5 Sheets-Sheet 5

FIG. 9

Gerald M. Webster INVENTOR.
BY John D. Gassett
ATTORNEY

United States Patent Office 3,209,317
Patented Sept. 28, 1965

3,209,317
SEISMIC EXPLORATION
Gerald M. Webster, Tulsa, Okla., assignor, by mesne assignments, to Esso Production Research Company, Houston, Tex., a corporation of Delaware
Filed Apr. 3, 1961, Ser. No. 100,173
19 Claims. (Cl. 340—15.5)

This invention relates generally to the art of geophysical exploration using artificially induced seismic waves. It is particularly concerned with a vibratory seismic prospecting system.

Geophysical prospecting using artificially induced seismic disturbances has found wide application in the search for petroleum and other products. It is the general practice to initiate a seismic disturbance at a point near the surface of the earth. Part of the seismic waves generated travel downward within the earth until they encounter discontinuities in the earth's structure in the form of various substrata formations and the like. These discontinuities have the effect of reflecting a portion of the seismic waves back toward the surface of the earth. By arranging a plurality of geophones or other seismic transducers at spaced distances from the seismic source, it is possible to detect the arrival of the reflected seismic waves at the surface of the earth. These detected waves are translated into electrical signals which are indicative of the character of the ground motion and are usually referred to collectively as a reflection signal or seismogram which is in effect a composite signal made up of a plurality of electrical signals varying in frequency and amplitude.

The artificially induced seismic disturbance has been most frequently produced by initiating a dynamite explosion in a shot hole drilled in the surface of the earth. This has certain drawbacks including the hazard of handling dynamite, the cost of dynamite and the cost of drilling the shot hole. Recently interest has been shown in the industry in mechanical type seismic sources. One such mechanical system consists simply of raising a large mass several feet above the surface and dropping it. The force with which the weight strikes the earth induces a seismic disturbance. This system although having some merit, has the disadvantage of being difficult to transport because of its great weight. The method of generating seismic waves by detonating an explosive or dropping a weight are both effective but the operator has almost no control over the shape of the down traveling elastic pulse. It is also significant that the shape of the down traveling pulse is not the same from shot hole to shot hole or from one drop of the weight to the next. These problems are for the most part largely eliminated by the use of the system of the present invention which is disclosed herein.

In using either a dynamite explosion or a mechanical type seismic source the detected signal is cyclic and rather difficult to interpret. In using either the dynamite source or mechanical type seismic source much of the energy of the source is wasted in shattering the rock and compacting the soil. Also, the large amplitude seismic pulse makes it impossible to be used near dwellings or water wells, etc. A mechanical vibrator, somewhat like those used in testing heavy structures, is also a possible seismic source. Such vibrators, especially of the hydraulic or electro-magnetic type, can impart into the earth very faithfully a seismic input signal corresponding to an electrical control signal. While these vibrators are limited in the peak force they can exert, over a period of several seconds they can impart into the earth signals whose total energy is as great as the useful energy generated by dynamite explosions. However, these signals are such that it is difficult to determine at what time (which relates to depth) a reflection is detected. Various means for interpreting the detected signals have been advanced such as correlation. These systems while useful are nevertheless very time consuming. It is thus seen there is a need for a new system in which the processing of the seismic information is simplified.

Accordingly, it is an object of this invention to provide a processing system for the seismic signals in which the reflected events are relatively easy to detect.

Briefly in a preferred form, this invention includes feeding an impulse to a filter-amplifier having a broad band frequency character and appreciable phase distortion. Such phase characteristic makes the impulsive response long. In order to get the maximum energy into the ground, despite the peak force limitation of the vibrators, it is preferred that the impulsive response have no prominent amplitude variations. The output or impulsive response of the filter amplifier is used to drive or control a seismic vibrator which is coupled to the earth. The output from the vibrator is transmited downwardly through the earth and a portion of such signal is reflected from the underground formations toward the surface of the earth where the signal is detected by geophones or the like. The detected signal is recorded and is played back, reversed in time, and passed through the identical filter-amplifier used to obtain the impulsive response thus obtaining a processed detected seismic signal. This manner of processing of the detected seismic signal results, for each reflected pulse, in a convolution with itself reversed in time, that is in an autocorrelation, thus greatly emphasizing the reflection events and de-emphasizing the other portion of the signal.

The measured reflection signal, that is the record of the signal detected by the geophones, includes a number of reflection events of different amplitudes and arriving at different times. Each one of these events has a long sinusoidal shape of the controlled signal. Due to the overlap in time, it is difficult to see at just what time these reflections arrive. However, by passing the detected signal, reversed in time, through the filter amplifier used to obtain the impulsive response, the signal reflected from each subsurface event is changed in form; specifically, it is concentrated into an impulse similar to the impulse used originally in pulsing the filter-amplifier to obtain the controlled signal.

Other objects and a better understanding may be had from the following description taken in conjunction with the drawing in which.

Figure 1:
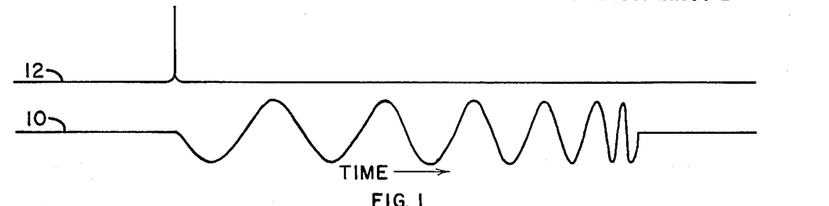
FIG. 1 illustrates typical curves used in an explanation of a part of this invention.

Turning now to the drawing, in FIG. 1 are curves used to illustrate characteristics of an electronic filter-amplifier which is used in the practice of this invention. Attention is also directed to FIG. 6 which shows in block diagram form one embodiment suitable for carrying out the invention. In FIG. 1 curve 10 illustrates a typical desired output of an electronic filter-amplifier for an input impulse as illustrated in curve 12. The input impulse 12 (identified as 12A in FIG. 6) is passed through two-position switch 17 to trigger a suitable filter-amplifier 14 (FIG. 6) to produce an output curve as illustrated typically in curve 10. A suitable filter-amplifier will be discussed in detail hereinafter. Preferred lengths in time of response curve 10 will also be discussed. The spike function input 12 fed to the filter-amplifier 14 can be considered as having an infinite band of frequencies all in phase at this one instant, thus the spike. The filter-amplifier passes only frequencies within a certain band width and has appreciably different time delays for the different frequency components of the spike. Therefore, in the output from the filter-amplifier there is no time at which the different frequency components are in phase to any extent. The output then, is of relatively long duration and preferably with no pronounced amplitude variations; a typical output signal from filter-amplifier 14 is illustrated in curve 10 of FIG. 1.

Figure 6:
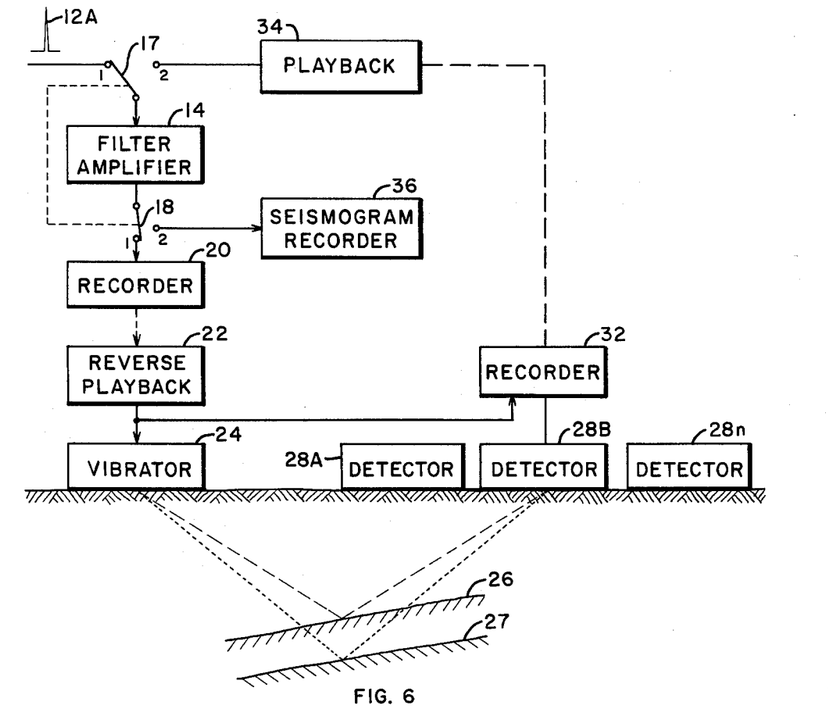
FIG. 6 illustrates in block diagram one embodiment of a system for carrying out the invention.

In a preferred embodiment as illustrated in FIG. 6, the output from filter-amplifier 14 is fed through two-position switch 18, in the position shown, to recorder 20 where the signal illustrated in curve 10 is recorded. Curve 10, which is recorded on recorder 20 is played back, reversed in time, in reverse playback 22. The output of reverse playback 22 has the form illustrated as curve 23 in FIG. 2. Curve 23 can also be called the control signal as it controls or drives vibrator 24. Vibrator 24 can be any one of many types capable of following the control signal curve 23. More specifically, the vibrator can be a loud speaker coupled to the ground, a hydraulic vibrator, or an electrodynamic generator. A suitable electrodynamic vibrator is illustrated specifically on page 281 of Sonics by Theodor F. Hueter and Richard H. Bolt, copywright in 1955 by John Wiley & Sons, Inc.

The seismic or earth input signal from vibrator 24 passes downward into the earth until it encounters a discontinuity such as interface 26 where a part of the signal is reflected back toward the surface of the earth and is detected by spaced seismic detector locations or stations 28A, 28B and 28n. Each detector location 28A may comprise a plurality of geophones arranged in any well known manner to improve the quality of the detected signal. The geophones are capable of transforming detected mechanical motion into electrical signals. The control signal from reverse playback 22 in addition to being fed to vibrator 24, is also fed to multiple recorder 32. Detector stations 28A, 28B through 28n are also connected to multiple recorder 32. Recorder 32 may take on various forms, but is preferably a magnetic recording means. Numeral I of FIG. 2 designates typical curves, illustrated in simplified form, of various signals recorded on a multiple channel recording medium. Numeral 23 illustrates the control signal from reverse playback 22. The numerals 30A, 30B and 30n illustrate seismic signals detected at detector stations 28A, 28B and 28n. The group of curves designated I comprising curves 23, 30A, 30B and 30n are on one recording medium and thus have the same time scale. It is to be noted that the detected signals are detected later in time than the transmitted signal.

Figure 2:
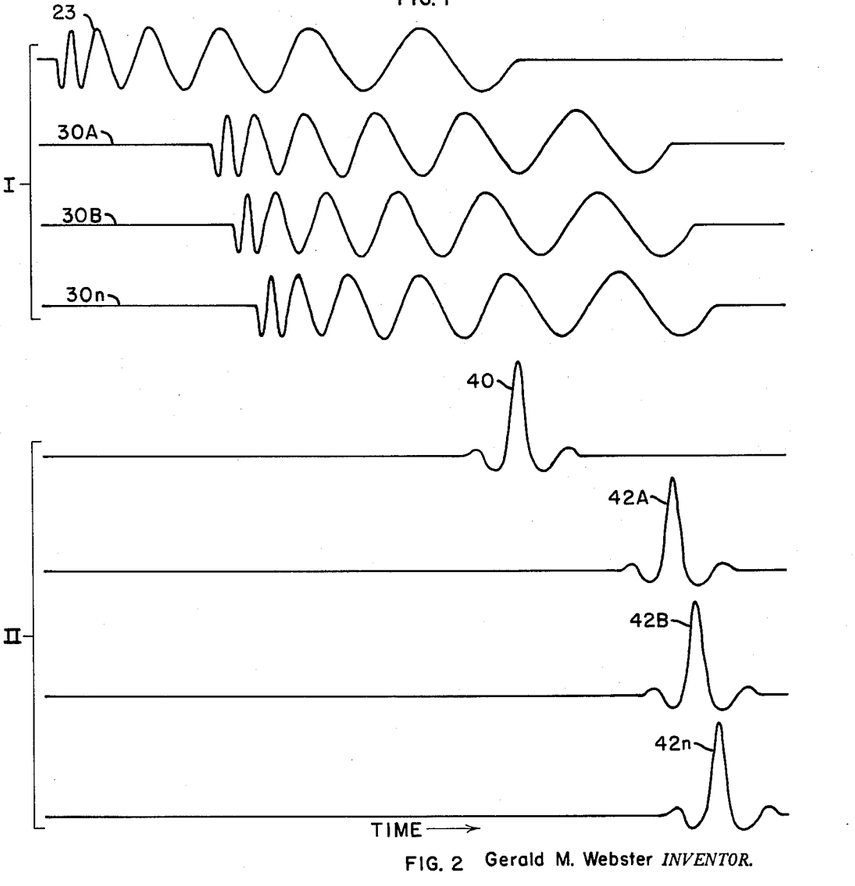
FIG. 2 illustrates a typical control signal, detected signals and processed signals.

In the system shown in FIG. 6 the control signal 23 and each of the detected signals 30A through 30n are processed individually through playback 34 which reproduces the signals recorded on recording medium I. The control played back signal 23 is processed first and is reproduced by playback means 34. This reproduced signal 23 is fed through switch 17 which is now in its number two position through filter-amplifier 14, which is the original filter-amplifier which was used in expanding the pulse into the long control signal 10. It is to be understood that another identical filter-amplifier or one with essentially the same responsive characteristics can be used. Switches 17 and 18 are ganged, thus when switch 17 is moved to its number two position, so is switch number 18. Therefore, the output of filter-amplifier 14 is fed to a seismogram recorder 36 which can be any of numerous recorders but is preferably a magnetic recording medium. The signal which is passed out of filter-amplifier 14, upon processing the control signal 23, is illustrated in FIG. 2 as a pulse 40. Signals 30A through 30n are likewise passed through filter-amplifier 14 in a similar manner and pulses 42A, 42B and 42n are obtained. Pulses 40, 42A, 42B and 42n are preferably placed upon a common recording medium referred to as record II.

A word of explanation will now be given as to why pulse 40 is produced when signal 23 is processed through filter-amplifier 14 in the manner described above. The output function from filter-amplifier 14, which is illustrated typically as curve 10, is reversed in time such as is illustrated in signal 23. This reversed function 23, which is the control signal for vibrator 24, is then fed through the same or identical filter-amplifier as filter-amplifier 14 which was used in producing the function illustrated in curve 10. As the same filter is used, the characteristics are the same, i.e. it has the same delay characteristics for each frequency component. Thus, when the reverse function is fed through the filter-amplifier, it is seen then that the delays of the various frequency components are such that when the different frequency components pass through the filter-amplifier, they are all shifted back into phase and the output of the filter-amplifier then has somewhat the identity of a spike. If the filter were ideal, that is, if it passed all frequency components which a spike contained, the original spike would then be recovered in the output of the filter-amplifier after the reverse signal has been fed through it. However, since the filter is not ideal, the output will take on the form similar to that illustrated as pulse 40. It will be noted that in FIG. 2 group I and group II are on the same time scale. Thus, spike pulse 40 occurs at the end of the duration of control signal 23; pulse 42A at the end of detected signal 30A, etc. In determining the depth of reflection event 26, the time which is important on record or group II is the time between pulse 40 and the occurrence of pulses 42A, 42B and 42n, which tend to line up. This, then gives the travel time of the signal from vibrator 24 down to the reflection event 26 and back up to each detector station. It can be noted here that various static and dynamic corrections can be applied to the detected signals in this application in a similar manner to that which is done on conventional seismic records.

The action of the filter-amplifier used herein can be described mathematically. The impulsive response of the filter-amplifier will be identified as $f(t)$. The frequency spectrum of this time function, which is the frequency response of the filter, can then be called $g(w)$. These are related through the equation $$g(w) = \int_{-\infty}^{\infty} f(t) e^{iwt} dt$$

When the impulsive response $f(t)$ is reversed in time and delayed in time by an amount D, it is described mathematically as $f(D-t)$ and its frequency spectrum is given by the expression $\bar{g}(w)e^{iwD}$, where $\bar{g}(w)$ is the complex conjugate of $g(w)$. Passing this function, $f(D-t)$ through the filter, results in the multiplication of its frequency spectrum $\bar{g}(w)e^{iwD}$ by the filter's frequency spectrum $g(w)$. This final output, therefore, has for its frequency spectrum, a frequency spectrum which is expressed by $[g(w)\bar{g}(w)]e^{iwD}$. This is the frequency spectrum of a symmetric pulse delayed in time by an amount D. This symmetrical pulse is in fact the autocorrelation function of the impulsive response $f(t)$. A typical form of this symmetrical pulse is illustrated in curve 40 of FIG. 2. As the filter-amplifier is designed to pass wider bands of frequencies, this symmetrical pulse approaches a spike such as illustrated in curve 12 of FIG. 1.

Figure 3:
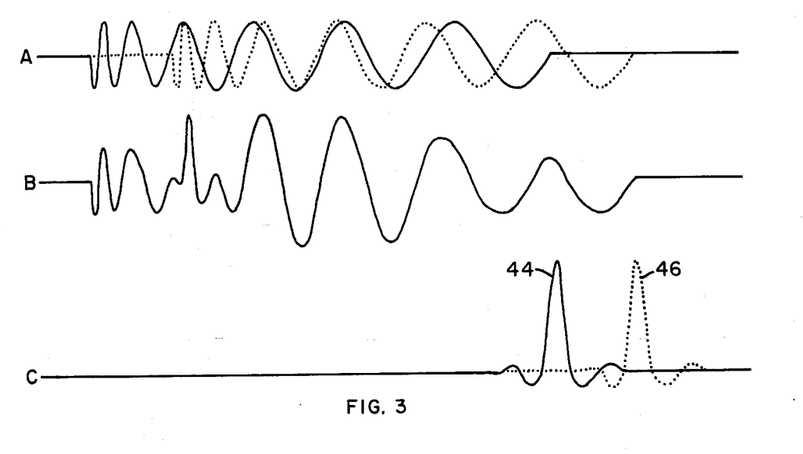
FIG. 3 represents typical curves illustrating a more complex detected signal such as when reflected signals from two or more subsurface events arrive at the geophone in overlapping time.

In the explanation given above in regard to the signals of groups I and II, the reflection from only one event, such as subsurface event 26, was included so as to simplify the explanation of the invention. However, in field exploration operations, the geophone signal which is detected, is a combination of many reflections of the input signal. These many reflections arrive at the geophone at different times. Thus, there is illustrated two reflections in curve A of FIG. 3. The solid line represents a reflection from subsurface event 26 of FIG. 6, and the dotted line which is displaced in time is a reflection from the deeper event 27. As these events are overlapping, the resulting signal is a composite signal typically illustrated as curve or signal B. When the combination or composite signal B is put through filter-amplifier 14, the presence of the other reflections does not in any way change the action of the filter-amplifier on any detected reflection. This is true as the amplifier is of a linear nature. Therefore, the final output of the filter-amplifier comprises a series of relatively sharp pulses as illustrated in curve C of FIG. 3. Since the sharp pulses are the reflected events concentrated or compressed in time, the reflected events are no longer overlapping in any appreciable amount and can therefore readily be interpreted. Thus, pulse 44 is representative of event 26 and pulse 46 is representative of subsurface event 27.

In the operation of the system illustrated in FIG. 6, it is anticipated that a part of the system will normally be used in a processing office and a part in the field. For example, normally filter-amplifier 14 is located in a processing office and is triggered by a sharp spike to obtain a long impulsive response which is recorded on recorder 20. This record recorded on recorder 20 may be stored for a period of time and then taken to the field at the time desired. The field operations usually involve the use of reverse playback 22, vibrator 24, detectors 28A to 28n and recorder 32. In the field the long impulsive response is played back reversed in time through reverse playback 22 to supply a control signal to drive vibrator 24. This control signal can be reproduced at many locations in exploring an area and the operator can be assured that the earth input signal at each location is identical to the other earth input signals. The input seismic waves then travel downwardly into the earth until they are reflected back toward the surface and detected by detectors 28A to 28n. The outputs of these detectors then are recorded on multiple channel recorder 32 and upon which the output of reverse playback 22 is also recorded in a manner to maintain the time relationship between the control signal from reverse playback 22 and the time of detecting the reflected signals. The record from recorder 32 can then be manually carried or otherwise taken to the processing office where it is placed on playback 34, reproduced, and fed through filter-amplifier 14 to obtain the processed seismic signal. This processed signal is recorded on the seismogram recorder 36. As a matter of convenience, a plurality of identical filter-amplifiers 14 can be provided so that each record from each seismic station recorded on multiple recorder 32 can be processed simultaneously.

Figure 4:
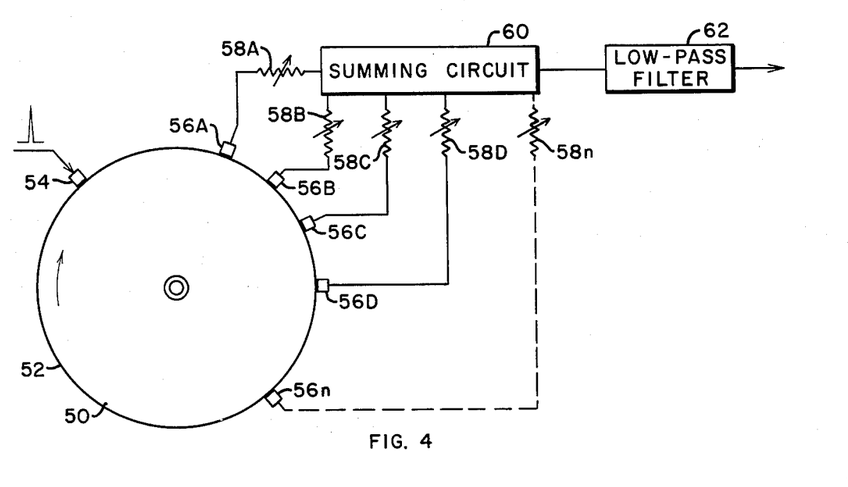
FIG. 4 illustrates a filter-amplifier suitable for use in the practice of this invention.

Turning now to FIG. 4, there is illustrated a suitable filter-amplifier. This particular filter-amplifier can be more specifically specified as a delay line filter. It comprises a delay drum 50 upon which is mounted a recording medium such as magnetic tape 52. A recording head 54 is provided for impressing or otherwise recording a signal upon recording medium 52. Spaced about the periphery of the recording medium are reproducing heads 56A through 56n. Modulators for the recording head and individual demodulators for each pickup head and suitable amplifiers are not shown as they are well known and would unduly complicate the diagram. Driving means not shown are provided to rotate drum 50 at a desired or selected speed of rotation. Associated with each reproducing head 56A through 56n are individual potentiometers 58A through 58n. The output from each of the potentiometers 58A through 58n are passed through a summing circuit 60. The output of the summing circuit is passed to a low-pass filter 62.

One means of determining the number of reproducing heads 56A and the magnitude of the spike signal reproduced by each such reproducing head will now be discussed. Attention in now directed to FIG. 5 which shows typical selected or desired filter-amplifier output response curves A and B. As illustrated in curve A, each half cycle is divided into many vertical area segments 64A through 64n. A reproducing head on drum 50 is provided for each area. The spacing of the heads are determined by the distances between centers of the successive vertical area 64A. The magnitude of the signal reproduced from 56A is proportional to the area within the respective vertical segment area 64A of curve A. It is, of course, understood that the smaller the vertical segment area, the greater the accuracy of the filter-amplifier in producing as its impulsive response, a desired signal. However, as a practical matter the number of such vertical segments is limited. For example, if it is desired to have the signal represented by curve 10 be four seconds long and have a frequency range of 15 c.p.s. to 75 c.p.s. and the heads are spaced every 5 milliseconds, this results in 800 reproducing heads which is extremely great. For most seismic exploration operations the length of the impulsive response 10 or control signal 23 is between about 1 second and about 6 seconds; however, the usually preferred duration is about 4 seconds. The usual frequency range of interest is from about 15 c.p.s. to 75 c.p.s.; however, the range can be as great as from about 10 c.p.s. to about 200 c.p.s.

Figure 5:
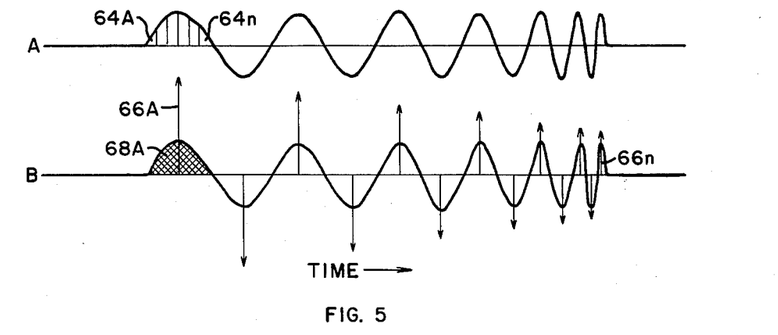
FIG. 5 illustrates ways of determining the spacing and output of the various heads on the filter-amplifier of FIG. 4.

An alternate and preferred way of producing a desired response, from a practical standpoint, is illustrated in curve B of FIG. 5. The area under each half cycle in the curve is determined and spikes 66A through 66n are drawn or otherwise determined for each such half cycle. The magnitude of the spike is proportional to the area 68A for its corresponding half cycle. The location of the spike 66A is in the center of the half cycle it represents. A reproducing head for each spike 66A through 66n is provided as reproducing heads 56A through 56n respectively on the recording drum 50. The heads are spaced about the drum in proportion to the distance between the spike 66A through 66n in curve B of FIG. 5. The operating length of the circumference of the drum is sufficient to obtain the selected length of the control signal 23.

Potentiometers 58A through 58n are set in accordance to the magnitude of the pulse 66A through 66n. Then for operation, all that is necessary to do is to feed an input spike such as input 12 into recording head 54. As the drum rotates in a clockwise direction as indicated, the pulse is first reproduced by head 56A and its magnitude determined by potentiometer 58A. This signal is passed through summing circuit 60, which has essentially no delay for any of the frequency components. As the drum continues to rotate, the spike that was imparted into the record by recording head 54 is next detected by head 56B. For its output spike it has its magnitude determined by potentiometer 58B. This output then is passed through summing circuit 60. This is repeated for each of the reproducing heads through 56n until a pulse has been reproduced representing in time and in magnitude each pulse or spike 66A illustrated in curve B of FIG. 5.

The output of summing circuit 60 is in effect a series of spikes whose time and magnitude is a reproduction of the time or spacing, and magnitude of the pulses 66A of curve B. The output of summing circuit 60 is fed through low-pass filter 62. Low-pass filter 62 is of a character to have an output signal which is essentially the envelope of these output spikes from summing circuit 60. Thus the signal produced from low-pass filter 62 as the impulsive response of the entire filter is then an analog production of curve B of FIG. 5. This output is termed a control signal and this particular signal has a duration of about four seconds, assuming that curve B is of the preferred duration. If the frequency range of interest is about 15 to 75 cycles per second, which is the usual frequency range of interest in seismic prospecting, there would be approximately 180 heads on the drum. It will, of course, be understood that the frequency range of operation of the device can be adjusted to a higher or lower band by speeding up or slowing down the drum rotation. Also, the spacing of the heads can be arranged such as to obtain any desired frequency range.

Figure 9:
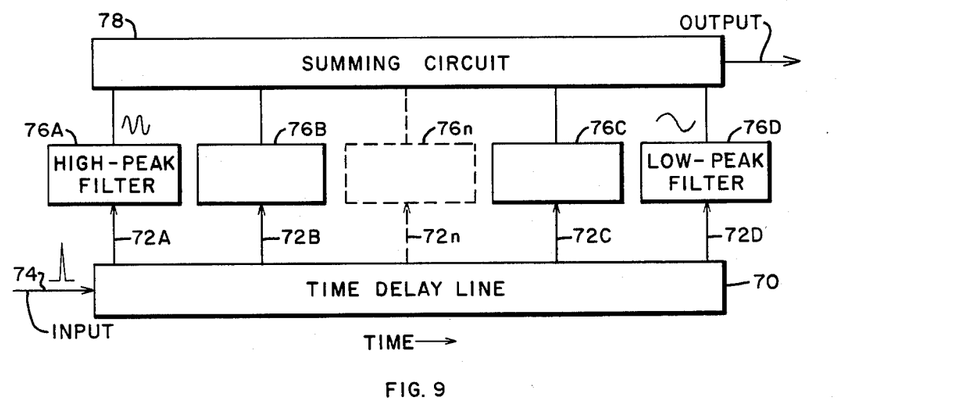

Turning now to FIG. 9, there is illustrated another filter-amplifier means shown in block diagram which is suitable for use in this invention. This filter-amplifier can be used for example as filter-amplifier 14 of FIG. 6. A time delay line 70 is provided and has a plurality of outlets or time taps 72A through 72n. An input 74 is provided to the time delay line for putting a signal thereinto. The difference in time between delay tap 72A and 72D is determined by the length of the selected control signal, such as signal 24. Output 72A through 72n are connected electrically respectively to each of filters 76A through 76n. Each filter 76A through 76n is designed to pass different frequency components therethrough and are spaced over the frequency range of interest giving each frequency component its selected delay. Each filter is rather sharply tuned to the frequency components assigned to it. The spacing of the peak frequencies and the sharpness of tuning are such that the over-all frequency response of the filters in combination is rather flat between the assigned frequency limits. The output of each filter is fed to a summing circuit 78.

In operation the filter-amplifier of FIG. 9 is used similarly to the filter-amplifier of FIG. 4. For example each are triggered by an impulse, such as 12 of FIG. 1, to obtain a long impulsive response. This response is used to control a vibrator. The reproduced signal from playback 34 is processed through the filter-amplifier by being fed to input 74.

The total time delay between the first tap and the last tap on time delay line 70 need not be the full length of time selected for the response or control signal 10. This is readily accomplished by having frequency responses of the various filters increased by a selected factor over that desired in the control response and then playing the "fast" output from summing circuit 78 back in "slow" time decreased by the same factor. As an example, if it is desired that the filter-amplifier of FIG. 9 have an output response or control signal with a frequency of 15 to 75 cycles per second but it is desired to reduce the time between the first and last delay on time delay line 70 by a factor of 10, then each of the filters 76A through 76n are selected to have a frequency range increased by a factor of 10, i.e. collectively covering a band from 150 to 750 cycles per second. The impulse response from summing circuit 78 can be termed a "fast" response and is then recorded. The "fast" response has a frequency range of 150 to 750 cycles per second as recorded. In order to return this signal to the desired frequency range and its desired length in time, it is only necessary to reproduce the signal at 1/10 the rate at which it was recorded. This reproduced signal, in this example, then is an impulsive response of the desired duration (10 times the duration of the "fast" output duration) and having the desired frequencies (1/10 of the fast output frequencies). This "slowed" impulsive response is then reversed and used as the control signal is the embodiment shown in FIG. 6, for example. When the record of the detected reflected signal is processed through the filter-amplifier of FIG. 9, it is reproduced at an increased rate of speed, the same as the decrease in speed in reproducing the response from summing circuit 78, i.e. in the example given, 10 times. The system of FIG. 9 then is particularly advantageous inasmuch as it greatly increases the speed at which a detected reflected signal can be processed. It also greatly reduces the requirements on the length of delay of time of the delay line.

Figure 7:
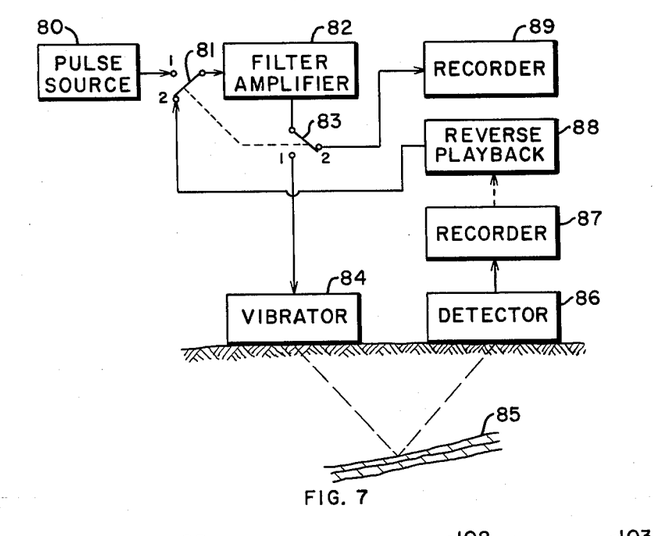
FIG. 7 illustrates in block diagram form another embodiment of the invention.

In the description of the operation of the system shown in FIG. 6, filter-amplifier 14 was triggered by a sharp spike. The output of filter-amplifier 14 was then recorded and played back in reverse form by reverse playback 22 to give a control signal for controlling the vibrations of vibrator 24. It is to be understood that the unreversed output of filter-amplifier 14 can be used as the control signal for driving vibrator 24; however, in such an event, the detected reflected seismic signal is reversed before it is fed through filter-amplifier 14. This is essential in order that the filter-amplifier can reproduce a spike-like impulse. A schematic diagram illustrating a system wherein the output of filter-amplifier is used as the control signal directly is illustrated in FIG. 7. The pulse from pulse source 80 is connected through two-position switch 81 when in position one to filter-amplifier 82. Filter-amplifier 82 is similar to filter-amplifier 14. The output of filter-amplifier 82 is passed through two-position switch 83 when in position one to drive or control vibrator 84. Switches 83 and 81 are ganged such that they are simultaneously in position one or in position two. Vibrator 84 is similar to vibrator 24 of FIG. 6. The earth input seismic wave from vibrator 84 travels downwardly in the earth until it encounters a discontinuity such as interface 85 where a part of the energy is reflected back toward the surface and detected by detector 86. The output of detector 86 is recorded on recorder 87 upon which a reproducible record is made.

A reproducible record of recorder 87 is played back, reversed in time, by reverse playback 88. When the reverse playback is started, switches 81 and 83 are put in their number two positions. The output from reverse playback 88 then is fed to the input of filter-amplifier 82 which compresses, in time, each reflection detected by detector 86 and recorded on recorder 87. The output from filter-amplifier 82 then is similar to the output of filter-amplifier 14 when switch 17 is in its number two position, i.e. when either filter-amplifier is being used to process the detected seismic signal. The output from filter amplifier 82 then is fed through switch 83 to recorder 89. It is, of course, understood that detector 86 can comprise several detector stations and that recorder 87 can comprise a multiple channel recorder such that each station is recorded independently. It is further to be understood that if more than one channel from the recording of the detected signal is desired to be processed simultaneously that additional identical filter-amplifiers can be constructed and simultaneously used.

Figure 8:
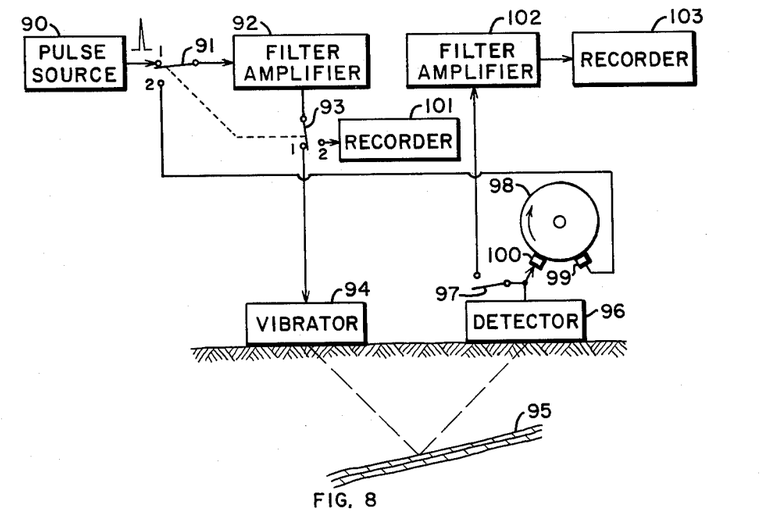
FIG. 8 illustrates in block diagram form still another embodiment of this system useful for carrying out the invention.
Figure 8A:
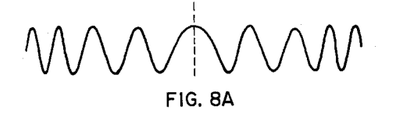
FIG. 8A illustrates a symmetrical control signal for use with the system shown in FIG. 8; and, FIG. 9 illustrates in block diagram form another filter amplifier suitable for use in this invention.

If the filter-amplifier used in this invention is designed such that its output impulsive response is symmetrical with respect to time about a center point, then it is not necessary to reverse either the control signal from the filter-amplifier or the detected reflected seismic signal. A symmetrical control signal is illustrated in FIG. 8A. An amplifier capable of producing this type signal can be constructed following the general directions given in regard to constructing a filter-amplifier illustrated in FIG. 4. The system shown in FIG. 8 is for use with a symmetrical control pulse. An impulse from pulse source 90 is fed through two-position switch 91 to filter-amplifier 92. The filter-amplifier 92 is designed to have an output response to the input spike which is a symmetrical signal such as illustrated in FIG. 8A. The output of filter 92A is passed through switch 93 when in position one to vibrator 94, which is similar to vibrator 24. The seismic input wave from vibrator 94 passes downwardly into the earth until it encounters an interface such as 95 and a portion of the signal is reflected back toward the surface and is detected by detector 96. The output from detector 96 can be recorded on a recording medium on drum 98; such a medium can conveniently be magnetic tape. The information recorded on the recording medium is reproduced by reproducing head 99. The time between the first signal being added to head 100 and the time it is first reproduced at 99 is selected such that the response from filter-amplifier 92 (as illustrated in FIG. 8A) is complete before the recorded signal arrives at reproducing head 99. At this time switch 91 and 93, which are ganged, are placed in their number two position. The output signal reproduced by reproducing head 99, which is the detected reflected recorded signal, is fed through switch 91 to input filter 92. Filter amplifier 92 then processes the signal similarly as described above in regard to filter-amplifier 14 in FIG. 6. The output of filter-amplifier 92 then is a processed seismic signal and is recorded on recorder 101. The processed signal has sharp impulses for each reflected event.

FIG. 8 also shows an alternate means of processing a seismic signal. An additional filter-amplifier 102 identical to filter-amplifier 92 is provided and is connected directly to the output of detector 96 through switch 97. In this position filter-amplifier 102 receives the signal direct from the detector and processes it immediately in the similar manner as filter-amplifier 92. The output of filter-amplifier 102 then is a processed seismic signal and is recorded on recorder 103.

While there are above disclosed but a limited number of embodiments of the system of the invention herein presented, it is possible to produce still other embodiments without departing from the inventive concept herein disclosed. It is therefore described that only such limitations be imposed on the appending claims as are stated therein.

What is claimed is:

1. A method of seismic exploration using a filter-amplifier having a broad band frequency character with phase response such that the phase characteristics make the impulsive response long which comprises the steps of:
   (a) feeding an impulse to said amplifier;
   (b) driving a seismic vibrator with the output of said amplifier;
   (c) detecting the reflection of the output from said seismic vibrator;
   (d) recording the detected signal;
   (e) reversing in time the detected signal;
   (f) passing the reversed signal through the amplifier thus obtaining a second output, and
   (g) recording the second output from said amplifier.

2. In a method of seismic exploration in which earth input signals are transmitted downwardly into the earth and reflections of the input signals from underground formations are detected, the improvement of using a filter-amplifier means having a broad band frequency character with phase response such that the impulsive response of the filter-amplifier is long in which comprises: generating earth input signals which are controlled by the impulsive response; and passing the detected reflected signal through the filter-amplifier used to produce the impulsive response, the detected signal and the impulsive response being reversed in time in relation to each other.

3. A method of seismic exploration using a filter-amplifier having broad band frequency character such that the phase characteristics make the impulsive response long which comprises the steps of:
   (a) feeding an impulse to said amplifier;
   (b) reversing in time the output of said amplifier;
   (c) driving a seismic vibrator with the reversed output of said amplifier;
   (d) detecting the reflections from subterranean formations;
   (e) passing the detected signal through the amplifier; and
   (f) recording the output from said amplifier.

4. A method of seismic exploration in which a seismic disturbance is transmitted through the earth and reflected back and detected at the surface which comprises:
   (a) expanding a pulse, through a selected circuit means having a broad band frequency character such that the phase characteristics make the impulsive response long, into a control signal which is of relatively long duration with no prominent amplitude variation;
   (b) transmitting a seismic input signal into the earth, such input signal being controlled by the control signal;
   (c) detecting seismic output signals reflected from subterranean structure;
   (d) passing the detected signal through said selected circuit means to obtain a processed output seismic signal; in the method, reversing in time, only one of the following two signals: (1) the control signal before it controls the seismic input signal and (2) the detected signal before it is passed through the circuit means;
   (e) and recording the processed output signal.

5. A method as defined in claim 4 in which the control signal is at least one second in duration.

6. A method as defined in claim 4 in which the control signal has frequency components in the range from about 15 c.p.s. to about 75 c.p.s.

7. A method of seismic exploration using an amplifier filter having a broad band frequency character with phase response such that the phase characteristics make the impulsive response long and further characterized in that such response is symmetrical with respect to time which comprises the steps of:
   (a) feeding an impulse to said amplifier;
   (b) driving a seismic vibrator with the output of said amplifier;
   (c) detecting reflected signal from the seismic vibrator;
   (d) passing the detected signal through the amplifier thus obtaining the processed seismic signal.

8. In a method of seismic exploration in which an earth input signal is transmitted downwardly into the earth and reflections of the input signal from sub-surface formations are detected, the improvement of using a circuit means having a broad band frequency character with phase response such that the impulsive response is long and symmetrical with respect to time about a center point which comprises: controlling the earth input signal with the impulsive response; and passing the detected reflected signal through the circuit means.

9. In a method of seismic exploration in which an earth input signal is transmitted downwardly into the earth and reflections of the input signals are detected, the improvement of using a circuit having a broad band frequency character with phase response such that the impulsive response of the circuit is long which comprises: generating an earth input signal which is controlled by the impulsive response reversed in time; and passing the detected reflected signal through the circuit.

10. In a method of seismic exploration in which an earth input signal is transmitted downwardly into the earth and reflections of the input signal are detected, the improvement of using a circuit means having a broad band frequency character with phase response such that the impulsive response of the circuit to an impulse is long which comprises: generating an earth input signal controlled by the impulsive response, and passing the detected reflected signal, reversed in time, through the circuit means.

11. In a method of seismic exploration in which a seismic input signal is transmitted downwardly into the earth and reflections of the input signal from subsurface formations are detected at the surface of the earth the improvement which comprises: controlling the seismic input signal with an impulsive response of a selected circuit means having a phase characteristic such that the response is long; and passing the detected reflected signal through the selected circuit means, the reflected signal being reversed in time in relation to the impulsive response.

12. An apparatus for use in seismic exploration which comprises in combination: a filter-amplifier having a broad band frequency character-phase response such that the phase characteristics make the response to an impulse excitation long; first recording means to record the output signal of said amplifier filter; first reproducing means to reproduce the recorded output signal reversed in time as reversed output signal; vibratory means responsive to the reversed output signal; geophone means to detect reflected signals; second recording means to record the detected signals; second reproducing means to play back the recorded detected signal, such second reproducing means connectable to said amplifier filter; and means connectable to record the output of said amplifier filter when said second reproducing means is connected thereto.

13. In a method of seismic prospecting wherein an input seismic signal having a wide range of frequency components substantially out of phase for the duration of the signal is imparted at a first point into the earth, and the reflection of the input signal from a subsurface stratum is thereafter detected at a second point spaced from said first point, the improvement which comprises passing the detected signal through a filter means whose impulsive response is a waveform similar to the input signal reversed in time.

14. In a method of seismic prospecting wherein an input seismic signal having a wide range of frequency components substantially out of phase is imparted at a first point into the earth, and the reflection of the input signal from a subsurface stratum is thereafter detected at a second point spaced from said first point, the improvement which comprises passing the detected signal reversed in time relative to the input signal through a filter means whose impulsive response is a waveform similar to the input signal.

15. A method of seismic prospecting which comprises imparting a seismic signal having a plurality of preselected out-of-phase frequencies into the earth at a first point, thereafter detecting a reflection of said signal from a subsurface stratum at a second point spaced from said first point, and filtering the detected signal reversed in time relative to said input signal to put said out-of-phase frequencies into phase.

16. In a method of seismic prospecting wherein an input seismic signal having a wide range of frequency components substantially out of phase is imparted into the earth at a first location, and the reflection of the input signal from a subsurface stratum is thereafter detected at a second location spaced from said first location, the improvement which comprises, reversing in time the detected signal to obtain a reversed signal and linearly contracting the reversed signal by operating on it in the same manner required to obtain the input signal from an impulse.

17. In a method of seismic exploration wherein an input seismic signal is imparted at a first location into the earth and reflections of the input signal from underground formations are detected at a second location spaced from said first location, the improvement of using a linear filter amplifier means having a broad band frequency character with a phase response such that the impulse response of said filter amplifier means is long and having no alterations in the time scale of its output relative to its input which comprises: driving a seismic vibrator with the impulsive response of said filter amplifier means; reversing the detected reflected signal; and passing the reversed reflected signal through a filter means capable of producing said impulsive response.

18. In a method of seismic exploration wherein an input seismic signal is imparted at a first location into the earth and reflections of the input signal from underground formations are detected at a second location spaced from said first location, the improvement of using a linear filter amplifier means having a broad band frequency character with a phase response such that the impulse response of said filter amplifier means is long and having no alterations in the time scale of its output relative to its input which comprises: reversing the impulse response; driving a seismic vibrator with the reversed impulsive response; and passing the detected re-reflected signal through a filter means capable of producing said impulsive response.

19. A method of seismic exploration wherein an input seismic signal having a wide range of frequency components substantially out of phase for the duration of the signal is imparted into the earth at a first location, and a reflection of the input signal from a subsurface stratum is detected at a second location spaced from the first location, the improvement which comprises: filtering the detected signal reversed in time relative to said input signal to put said out-of-phase components into phase.

References Cited by the Examiner

UNITED STATES PATENTS

| 2,446,479 | 8/48 | Begun | 324—77 |
| 2,916,724 | 12/59 | Peterson | 340—15.5 |
| 2,982,852 | 5/61 | Fano | 325—44 |
| 3,045,207 | 7/62 | Peterson | 340—15.5 |
| 3,070,777 | 12/62 | Lindsey et al. | 340—15.5 |
| 3,076,176 | 1/63 | Lawrence | 340—155 |
| 3,076,177 | 1/63 | Lawrence et al. | 340—15.5 |
| 3,088,541 | 5/63 | Alexander et al. | 181—.5 |

SAMUEL FEINBERG, *Primary Examiner.*

CHESTER L. JUSTUS, STEPHEN W. CAPELLI,
*Examiners.*